United States Patent [19]

Arrigoni

[11] 4,309,848
[45] Jan. 12, 1982

[54] TURBINE BLADE TIP FINISHING APPARATUS

[75] Inventor: John P. Arrigoni, Wallingford, Conn.

[73] Assignee: United Technologies Corporation, Hartford, Conn.

[21] Appl. No.: 124,500

[22] Filed: Feb. 25, 1980

[51] Int. Cl.³ ............................................. B24B 21/00
[52] U.S. Cl. .............................. 51/135 R; 51/34 A; 51/100 R; 51/142; 51/165.92
[58] Field of Search ................... 51/34 A, 100 R, 127, 51/145 R, 165.92, 135 R, 142

[56] References Cited

U.S. PATENT DOCUMENTS

| | | | |
|---|---|---|---|
| 1,831,412 | 11/1931 | Ellenbecker | 51/100 R |
| 2,058,731 | 10/1936 | Sherriff | 51/34 A |
| 2,297,827 | 10/1942 | Ellenbecker | 51/100 R |
| 2,392,819 | 1/1946 | Gruenberg | 51/100 R |
| 2,431,822 | 12/1947 | Murray | 51/143 |
| 3,090,171 | 5/1963 | Stimson | 51/165.92 |
| 3,903,653 | 9/1975 | Imhoff | 51/165.92 |
| 3,969,848 | 7/1976 | DeMusis | 51/141 |
| 3,984,212 | 10/1976 | DeMusis | 51/140 |
| 3,988,126 | 10/1976 | DeMusis | 51/100 R |
| 4,016,683 | 4/1977 | Cretella | 51/143 |
| 4,028,787 | 6/1977 | Cretella | 29/156.8 |
| 4,028,788 | 6/1977 | DeMusis | 29/156.8 B |
| 4,051,636 | 10/1977 | Heine | 51/145 R |
| 4,065,879 | 1/1978 | Cretella | 51/145 R |
| 4,078,337 | 3/1978 | Chiasson et al. | 51/141 |

FOREIGN PATENT DOCUMENTS 830917 of 0000 United Kingdom .

*Primary Examiner*—Harold D. Whitehead
*Attorney, Agent, or Firm*—C. G. Nessler

[57] ABSTRACT

An apparatus for finishing the tips of turbine blades and the like is provided. The invention is especially useful on worn turbine blades which have been repaired by adding weld material. An abrasive first removes excess weld material with a reciprocating motion and constant force. A sensor indicates when the abrasive is a predetermined distance above the intended finish contour surface and thereafter there is a predetermined fixed time in which the material removal continues. During the predetermined time period the motion of the abrasive is converted to one along a guided path corresponding to the path of the finished surface contour by apparatus such as a cam and cam follower. Thus, the time of refinishing is reduced and labor productivity is increased.

4 Claims, 5 Drawing Figures

TURBINE BLADE TIP FINISHING APPARATUS

DESCRIPTION

Technical Field

The present invention relates to the field of metal finishing, most particularly the finish machining of the tips of airfoils for gas turbine engines.

A gas turbine engine is comprised of a multiplicity of airfoils having relative motion with respect to static parts of the machine. By way of illustration, a blade from the turbine section, such as is shown in FIGS. 1 and 2 is mounted in a rotating disk. The tip of the blade is very closely positioned within the inside diameter of portions of the engine case or housing and from time to time contacts same. Due to this and other destructive forces in the engine environment the blade tip will deteriorate. In the normal course of events it is desirable to refurbish such worn components, and to this end it is common to add material, such as by welding, to the tip. Thereafter it is necessary to machine the tip to restore the airfoil to substantially the dimension of a new replacement part. One method of doing this, used with new parts, comprises the placing of the blade in a rotating fixture somewhat similar to the engine disk and contacting the tips with a grinding wheel placed at a circumferential point such as is common with new parts. But owing to the multiplicity of different part designs which a typical airfoil repair facility must handle, this approach is economically unattractive and requires large machines. Of course, when blade tips are weld repaired there will be a tendency within a particular design for the amount of material being added to vary, and thus the amount of material which must be removed will vary.

The needs of gas turbine airfoil repair facilities have been recognized in the past, and much preference has been given to the familiar process of abrasive belt machining since turbine blades which are comprised of difficult to machine superalloys. By way of example, DeMuis in U.S. Pat. No. 4,028,788 discloses a machine wherein a component is contacted with a moving belt riding in a concave shoe, to produce a contoured airseal. The inventor herein, in his copending U.S. application Ser. No. 014,781, discloses another type of machine and method for refinishing turbine airfoils having outer shrouds with thin airseals; method involves the use of a contoured roller. However, the method in application Ser. No. 014,781 is not suited for finishing parts which have a substantial thickness as do blades such as shown in FIG. 1. Cretella et al in U.S. Pat. No. 4,065,879 discloses a means for resurfacing a gas turbine vane using an abrasive belt and a cam and cam follower which guides the belt along the complex contour of the vane. The abrasive is constantly controlled by the cam and in contact with the contoured airfoil (but not the tip). Similarly, Heine U.S. Pat. No. 4,051,636, discloses a method for airfoil abrasive contouring using a master pattern and mechanical copy machine principles. Thus, it may be said that abrasive belt machines are well known. And of course they are adapted to refinishing airfoils held in small fixtures or by hand, as well as under the control of cams and the like.

However, the machines of the prior art in many instances have the disadvantage of not being specifically adapted to the finishing of gas turbine airfoil tips and therefore are not highly productive. And the machines in the prior art which are adapted to machining gas turbine airfoils, either are not suited to producing the precise contour necessary in a turbine blade, or will not be productive of sufficient output to minimize the cost. For example, the machine of copending application Ser. No. 014,781 is only readily adapted to finishing a rather thin straight airseal. Examination of that machine and FIGS. 1 and 2 herein will reveal that an unwanted concave surface will result at the tip.

There are other problems for which the solutions are not evident in such machines as either exist or may be obvious. One is sensing when the tip is finished so that the operator, or automatic mechanism as the case may be, will know to remove the part and start the next. Sparks and visual indication of material removal continue to be produced in abrasive machining for sometime after the part is substantially finished, even when substantial further removal of material is prevented by a device such as a cam. Another problem is that the length of the blades which are being finished may vary substantially insofar as the amount of excess material to be removed. Therefore, a machine in which the motion is entirely controlled by a cam or other unitary type of motion needs to be operated for machining and material removal at the point in space where the greatest excess tip material will lie, i.e., when the longest part is encountered. But such a machine will be relatively inefficient as it maintains its designed motion when a shorter tip is present and there is nothing at the point in space to machine.

Therefore, there is a need for an improved, rapid, and flexible method of refinishing the tips of varied size and contour blades.

Disclosure of Invention

An object of the invention is to provide relatively low cost machinery for finishing turbine blade tips which have excess material thereon, such as material which has been added by processes such as welding.

According to the invention the tip of a blade is finished by first rapidly removing material in the manner which tends to concentrate removal wherever material remains, without respect to the final contour sought. Thereafter, material is removed according to a guided path which ultimately conforms with the intended final contour surface of the tip. The process is made more efficient by sensing when relatively little material is remaining above the intended finish surface and thereafter limiting the amount of time in which the material removal means is allowed to engage the tip (or move along the aforesaid guided path).

In a specific embodiment, a contact roller holding an abrasive belt is reciprocated generally across the cross section of a tip while being thrust along the longitudinal axis of the blade toward the tip by means of air cylinders. A fixed cam is disposed upon the base to which the airfoil is fixed. A cam follower attached to the contact roller engages the cam when material has been removed down to the desired contour surface, thereby mechanically preventing material removal below this surface. An electric switch is activated by proximity of the contact roller when the roller is several thousandths of an inch above the finished contour surface. After a predetermined time the contact roller is caused to retract from engagement with the blade. At this time it will be found that the blade has been finished and may be removed from the machine.

The invention is quite efficient, since with a limited amount of experiment the aforesaid predetermined time can be established. Therefore, the removal of material which is substantially in excess of the desired contour surface is removed in a very rapid fashion, as the abrasive is not required to be moved along an artificial and slow guided path, but is moved in a manner calculated to optimize the rate of removal of surplus material. Only when the intended finish surface is reached is the abrasive caused to move on the guided path. A feature of the invention is that the establishment of the predetermined fixed time in which to terminate the abrasive action avoids, on the one hand, undue lingering and "sparking out" which is common practice in ordinary grinding activities, or on the other, premature cessation and a resultant deviant part.

BEST MODE FOR CARRYING OUT THE INVENTION

The preferred embodiment is described in terms of abrasive machining of a superalloy turbine blade. But it ought to be appreciated that the invention is applicable to all manner of gas turbine airfoils, including blades and vanes both with and without shrouds, as well as for components of other types of rotating machinery and generally for any other part requiring a contour surface at its end. The invention will be also found useful with other means than the abrasive belt of the preferred embodiment, such as grinding wheels, milling cutters, and the like which remove material in an analogous localized manner.

Figure 1:
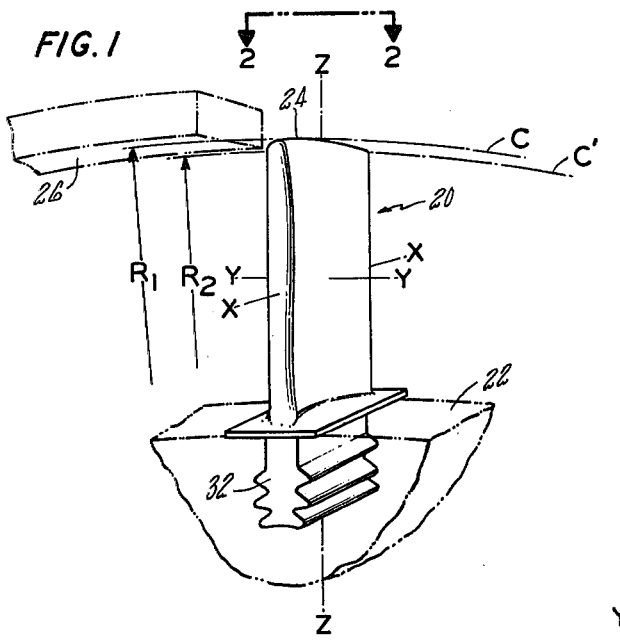
FIG. 1 shows a gas turbine blade having a contoured tip.
Figure 2:
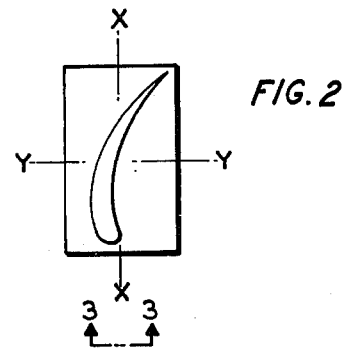
FIG. 2 is an axial view of the blade in FIG. 1.

A gas turbine blade 20 is shown in FIG. 1 as it is ordinarily mounted in a portion of a disk 22. For purposes of the present invention the blade can be characterized as having a longitudinal z axis perpendicular to orthogonal x and y axes. The y axis is taken as being directly tangent to the circumferential path around which the blade rotates when mounted in disk 22. The x axis is perpendicular to the y axis and therefore is nominally parallel with the axis of rotation of the disk. FIG. 2 further illustrates the axes of the blade. The tip 24 of the blade has a curved surface, in this case a fragment of a surface of revolution, so as to conform closely with the inner diameter of the static engine case structure, shown as the fragmentary phantom section 26. Thus, the contour of the tip in the y-z plane is substantially a curved surface congruent with the circumference C (having radius R) of the inner diameter of the engine. Inasmuch as the diameter of the engine may change along the axis of the disk (that is, in a direction parallel to the x axis of the blade) the front portion of the tip may have a first radius $R_1$ while the back portion may have a second radius $R_2$. Consequently it may be seen that to obtain the minimum clearance between the tip and the static structure a relatively accurate contour is needed on the tip.

Figure 3:
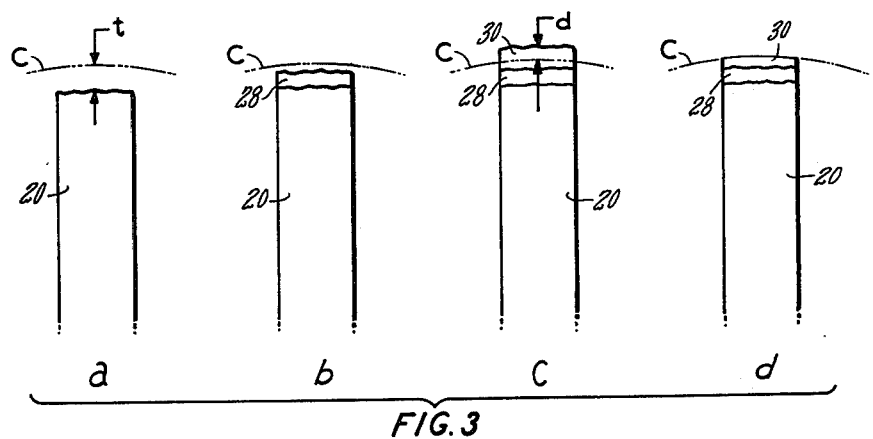
FIG. 3 is a partial view of a blade end showing the sequence of operations in repair of a tip.

FIG. 3 illustrates in sequential fashion the repair process during which the invention is used. FIG. 3a shows the change in length t which a worn blade sustains and which causes excess clearance and consequent gas turbine inefficiency. FIG. 3b shows the result of adding a first layer of weld material, usually superalloy similar to the blade alloy; this is followed by a second layer, usually a hard facing material as shown in FIG. 3c whereupon a purposeful excess of material, indicated by d results. Finally, a restored component, shown in FIG. 3d, results by use of the method and apparatus of the present invention to obtain the desired dimensions.

Figure 4:
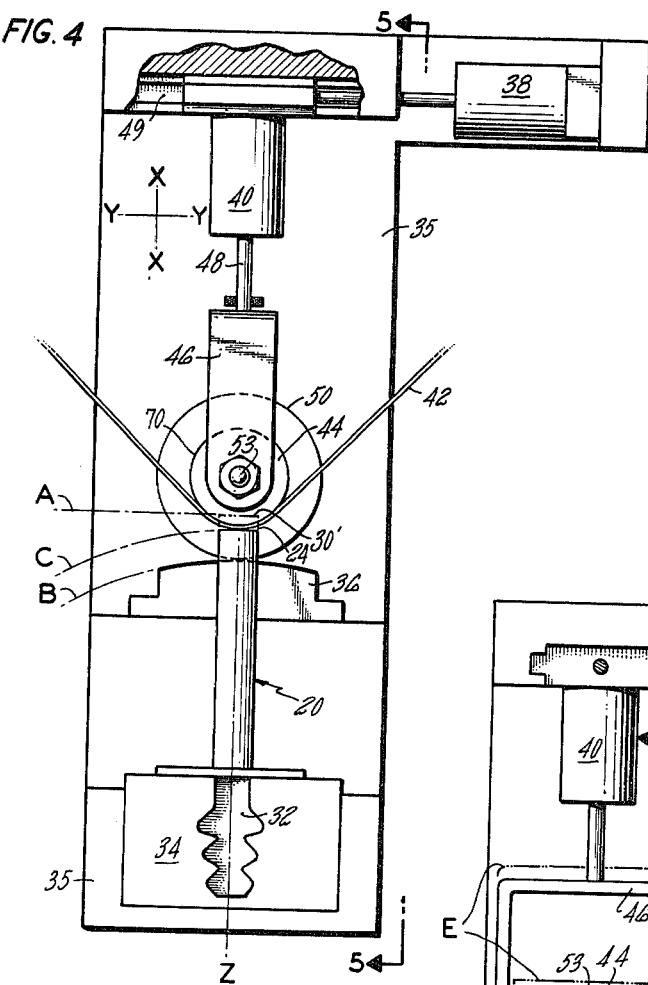
FIG. 4 is an elevation view showing an abrasive machine for refinishing a blade tip.
Figure 5:
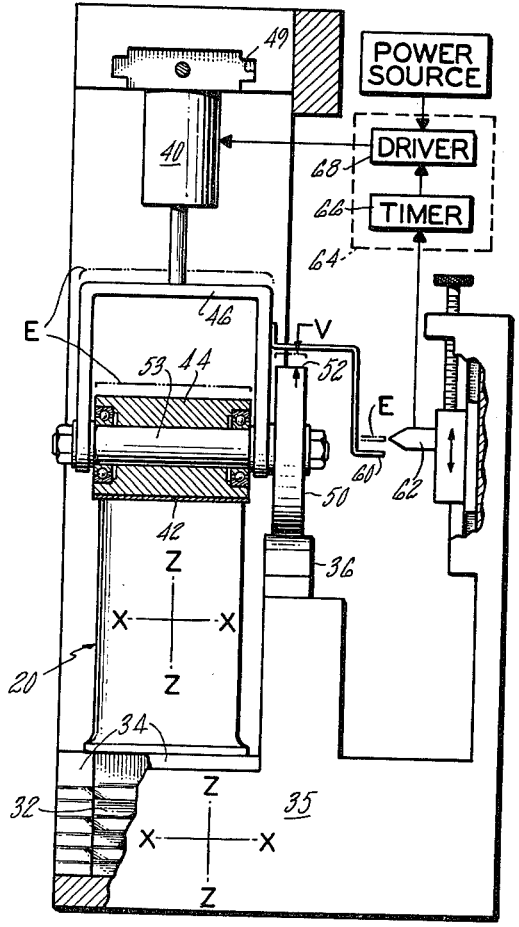
FIG. 5 is a side view of the apparatus in FIG. 5 with addition of a schematic control circuit.

FIGS. 4 and 5 represent the important elements of the instant invention. FIG. 5 is a side view of the elements shown in FIG. 4, with the addition of a schematic control system. Referring to FIG. 4, a turbine blade 20 is shown mounted by its root 32 in a holder 34 which is affixed to a base 35. The base has x, y and z axes and the airfoil is mounted to have its previously described axes co-aligned with these. Also mounted on the base are a fixed cam 36 and fixed horizontal (y axis) air cylinder actuator 38 which translates a movable vertical (z axis) air cylinder in horizontal track 49. An abrasive belt 42 is shown as it passes over a contact roller 44; this is referred hereafter as the abrasive. The abrasive belt is driven by a motor and tensioned and guided by other rollers which are not illustrated but which are familiar in the art. The contact roller is mounted in a bracket 46 which is connected to the output rod 48 of the vertical actuator 40. Thus, it will be seen that the roller and abrasive thereon is movable in the z axis by operation of the vertical air cylinder actuator 40 and movable in the horizontal y axis through the action of the horizontal air cylinder actuator 38. Thus, it will be appreciated that the abrasive may be translated in the y-z plane by controlled operation of the air cylinders 38 and 40. Prior to the start of the tip finishing operation, the turbine blade 20 will have excess material 30' which is shown in phantom in FIG. 4. Thus, operation of the air cylinders can cause the abrasive to contact the excess material at all points on the tip and thereby effect its removal.

In operation, the vertical cylinder is pressurized to cause the abrasive to move downward along the z axis while the horizontal cylinder causes a back and forth reciprocation generally along the y axis. The nature of the air cylinder actuator is that owing to the use of a compressible fluid, the force of the abrasive on the tip will be relatively constant regardless of small changes in displacement of the contact roller due to encountering higher or lower levels of excess material on the tip. The advance along the z axis toward the tip of the blade is controlled by the rate at which air is supplied to the cylinder, or by supplemental mechanical means.

Attached to the contact roller is a cam follower 50 which is adapted to contact the surface 52 of the cam 36. The surface has a contour B which is generally reflective of the contour surface desired in the airfoil tip (represented by line C). The cam contour B has due adjustment for the mechanical compensations that are ordinary and necessary in cam follower systems, to cause the desired movement of the roller 44 along the path C. Consequently, it may be seen from FIG. 4 that if the above-described operation of the air cylinders is undertaken, the abrasive will remove all the excess material until a point where the cam follower 50 will locally contact the surface 52 of cam 36. This contact will then cause the abrasive to be guided at that point along the path C. The area of cam contact and guided path length will increase as the excess material is removed and the desired contour surface on the airfoil tip is achieved. Thus, the action of the abrasive can be characterized as initially being productive of constant force with a vertical translation component dependent on the tip material which remains, i.e., it is not positively controlled. This is then converted to an action characterized by a guided path of controlled displacement, as the vertical force on the tip is lowered and absorbed by the cam system. It will be appreciated that the cam system is but one mechanical means of achieving the guided path and that other means, such as purely mechanical or a programmed control and feedback system, may be substituted to limit the translation and institute the desired final motion.

During the first development of the invention herein, the foregoing was the apparatus and mode of operation which were employed. But, while the use of the motions described produced an advantageous result, the process was somewhat inefficient in that it was not readily determinable when all the required material had been removed from the blade tip. Naturally, if the machine was continued in operation it ultimately became evident from the absence of any signs of cutting action that the part had been completed. Thereupon the abrasive belt could be removed from proximity of the blade and the part was removed from the holder. Therefore, a means was sought to improve the operation of the apparatus to increase the productivity of labor.

This was accomplished by introduction of an electrical position sensing system which is shown in FIG. 5 (and obscured in FIG. 4). The system is comprised of a probe 60 which is fixed to the holder 46 and thereby moves with substantially the same motion as do the contact wheel axis 53 and abrasive contacting the tip. The sensor is mounted on the base 35 and is slidably movable along the z axis. Thus, the probe will be sensed when the movable portions of the apparatus arrive at a position represented by the phantom lines E, wherein the cam follower 50 is a very small distance away from contact with the cam 36. Upon sensing the presence of the probe, the sensor sends a signal to a controller 64 which by means of suitable transducers and the like causes the reversal of the downward motion of the vertical cylinder 40 and the resultant withdrawal of the abrasive from proximity of the blade tip. Simply, the controller is comprised of a delay timer 66 which is settable to a desired delay increment during which the cutting action of the abrasive may be continued and following which it is then ceased through action of the driver 68 and actuator 40.

The probe-sensor system is preferably comprised of a circuit connected to the sensor so that it is above ground potential. Momentary contact of the probe with the sensor causes grounding, activation of the circuit, and transmittal of a signal to the timer. Other devices such as mechanical actuated electric or fluidic switches, magnetic or photo-optical proximity devices, and the like will be found suited as well.

In operation the sensor is set at a distance which is about 0.025 mm (0.005 inches) away from the furthest possible downward motion of the probe at the particular y coordinate of the sensor, as limited by the cam system. When the location determined by the sensor position is reached, the abrasive will be acting to vigorously remove material wherever it is in excess, as described above. (Depending on the y axis location of the sensor, the cam may or may not have engaged the cam follower at another y location, but this is not particularly important to the functioning of the invention.) A limited amount of experiment with the particular part will have revealed how much further time is required to remove the remaining excess material across the entire tip subsequent to the signal being transmitted by the sensor to the control system. The experiment involves reducing the time delay duration until gauging shows that the excess material is not being entirely removed. The distance is chosen to be rather small and the tip will be near its final dimension. Thus, when the sensor sends its signal it will be generally found that the amount of material remaining to be removed from one blade to the next will be relatively constant, since all the initial irregularities in surface contour that result from the welding will have been removed during the initial operations. The distance at which the signal is transmitted may be varied; preferably a distance of 0.025–0.125 mm is desirable for parts where about 2.0 mm of material are removed. But distances substantially in excess may be used for other situations provided at the time the signal is transmitted the volume of remaining material is relatively constant in amount and property from one part to the next. On the other hand, if the sensor is set too close to the final position to which the probe will move, the sensor positioning becomes accordingly much more critical and the apparatus will be prone to error. As an example, if the sensing point is set at the cam surface level then a small error in positioning of a sensitive sensor could result in no signal. Consequently, placing the sensor a significant but small distance above the cam has been found to eliminate a great deal of uncertainty and requirement for high precision in the apparatus.

The apparatus shown is quite amenable to finishing of differing parts, since different shape parts merely require substitution of a different holder and cam and appropriate adjustment of the sensor (which of course can be recorded and retrieved each time the particular design of part is repeated).

Other variations of the apparatus are possible. The cam 36 may have a surface 52 which is other than a simple curve. The contour 70 of the roller 44 may be varied along the x axis if it is desired to produce a compound curve on the part. Further, it should be evident that another degree of motion may be employed, namely, in the x direction, with cam dimension accordingly changed and presented, to produce a considerably more complex part than is required presently in gas turbine repair. Lastly, it will be appreciated that the original assignment of axes x and y to the blade was arbitrarily but conveniently made and that other obvious combinations of dispositions of the part may be made with respect to the axes of the machine of the invention.

Although this invention has been shown and described with respect to a preferred embodiment, it will be understood by those skilled in this art that various changes in form and detail thereof may be made without departing from the spirit and scope of the claimed invention.

I claim:

1. In apparatus for finishing the tip of a gas turbine airfoil to a desired contour surface wherein said apparatus has a base with x, y, and z axes, abrasive means for removing material from the tip, and means for holding an airfoil on the base so its longitudinal axis is substantially aligned with the said z axis in a manner which presents the tip for contact by the abrasive, the improvements comprising:

means for translating the abrasive along the z axis, toward the airfoil tip location, with a generally reciprocating action on a first path in the y-z plane of the base, to remove material from multiple points on the tip;

means for guiding the abrasive in the y-z plane along a second path corresponding to the desired finished contour surface, said guiding means becoming independently operable along said z axis path of translation at a point proximate the intended finished contour surface location of the tip;

means for producing an output signal as a function of a location of the abrasive with respect to the finished contour line, said location being along said y-z plane path and spaced apart along the z axis from the intended finished contour surface location;

means, responsive to said signal, for terminating abrasive removal of material after a predetermined delay time.

2. The apparatus of claim 1 wherein:

the abrasive is a moving belt;

the means for guiding the abrasive along the finished contour surface comprises a mechanical cam fixed to the base and a cam follower connected to the abrasive; and the means for producing an output signal comprises a device adjustable along the z axis of the base, said device producing a signal when the abrasive is a small z distance from the finished contour.

3. Apparatus for removing excess material and producing a desired finished contour surface on the tip of a gas turbine airfoil having a longitudinal z axis and cross-sectional x and y axes perpendicular thereto, comprising:

a base having x, y, and z axes;

a holder, mounted on the base, for positioning an airfoil on the base so that the x, y, and z axes are coaligned with the respective axes of the base and so that the blade z axis projects therefrom and the tip is exposed for finishing;

a contact roller, moveably mounted on the base, having an abrasive belt moving thereon in the y-z plane;

a cam having a surface generally reflective of the finished contour surface desired in the airfoil fixedly mounted on the base;

a cam follower connected to the contact roller, for causing the contact roller and abrasive belt thereon to follow the path of said desired finished contour surface and for preventing removal of material beneath said surface, the motion of the contact roller enabling the cam follower to engage and disengage the cam;

means for moving together the contact roller and holder, along the z axis, so the contact roller moves toward the location where the airfoil tip is positioned while reciprocating generally along the y axis, to remove material at points along the tip of an airfoil;

a sensor for signalling the position of the follower when it is a small distance along the z axis from a point on the cam; and means for separating the contact roller from the holder along the z axis in response to a time-delayed signal from the sensor.

4. The apparatus of claim 3 wherein the means for moving the contact roller along the z axis is comprised of a gas pressure device, such as an air cylinder, said device being productive of rapid motion when no resistance is encountered and of increasing but yieldable force when resistance is encountered, said resistance being such as is encountered from contact of the roller with a tip or contact of the cam follower with the cam.

* * * * *